Patented July 5, 1949

2,475,150

UNITED STATES PATENT OFFICE 2,475,150

RESINOUS INTERPOLYMERS

David T. Mowry, Dayton, Ohio, assignor to Monsanto Chemical Company, St. Louis, Mo., a corporation of Delaware No Drawing. Application February 19, 1945,
Serial No. 578,794

6 Claims. (Cl. 260—86)

The present invention relates to new resinous interpolymerization products.

An object of the present invention is to provide highly heat-resistant, readily moldable interpolymerization products of styrene.

I have found that valuable interpolymerization products may be obtained by polymerizing styrene in the presence of benzalphthalide:

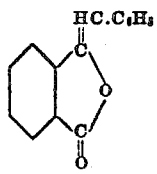

The present styrene interpolymers are characterized by excellent thermal stability, good resistance to organic solvents and good mechanical properties. My new styrene interpolymers in their clear and transparent form may be employed for the production of transparent objects such as windshields and the like, or for transparent, molded articles, for electrical insulating materials, etc. The excellent thermal stability, particularly the high heat distortion point of the styrene-benzalphthalide interpolymers makes them suitable for use in many fields where polystyrene, because of its lower heat distortion point, cannot be used.

For the production of clear, transparent, resinous products I prefer to employ mixtures of monomeric styrene and benzalphthalide in which mixtures the benzalphthalide content is below approximately 1:1 mole ratio (65% by weight, benzalphthalide) and preferably below 50% by weight of said mixture. Improvement of polystyrene is apparent even with as little as 0.1% by weight benzalphthalide in the interpolymer, although generally somewhat more is usually employed. Polymerization of the mixtures may be effected by any of the known polymerizing methods, for example, by polymerization in mass, in solution, in a liquid which is a solvent for the monomer mixture and a non-solvent for the interpolymer, in aqueous dispersion or in emulsion. Solvents such as dioxane and carbon tetrachloride dissolve both the monomers as well as the interpolymer. Solvents such as the lower aliphatic alcohols dissolve the monomers, whereas the interpolymer is insoluble therein. Accordingly, when the interpolymer is produced in solution in a solvent in which it is soluble, it may be recovered therefrom by pouring the solution of polymer into an alcohol such as methanol, ethanol or isopropanol. In continuous polymerization methods, stepwise addition of either of the two monomers, depending upon the rate at which they are consumed, may be employed.

The interpolymerization may be effected in the presence or absence of catalysts of polymerization. Suitable catalysts which may be used are benzoyl peroxide, acetyl peroxide, tertiary butyl hydroperoxide. Potassium or ammonium persulfates may be employed for emulsion polymerization. Temperatures of from, say, 40° C. to 125° C., depending upon the presence or absence of catalysts are generally employed.

The present invention is further illustrated, but not limited, by the following examples:

Example 1

A mixture consisting of 80 parts by weight of styrene and 20 parts by weight of benzalphthalide was mass polymerized, in the absence of a catalyst, by heating at a temperature of 70° for 8 days and then at a temperature of 100° C. for 5 days. The resulting hard product had an alcohol soluble content of 9.6%. The interpolymer was purified by dissolving in dioxane and precipitation in alcohol. The purified material had a softening point of 140° C., a melting point of 225° C. and a decomposition point of 250° C., as determined on the copper Maquenne bar. The product thus obtained was a fluffy, white powder, which was compression molded in a steel die employing the following conditions:

| | | |
|---|---|---|
| Temperature | °C | 170 |
| Pressure | P. S. I. | 2500 |
| Time | minutes | 10 |

The smooth, lustrous, molded material thus obtained was transparent, clear and colorless and was found to possess good mechanical strength and a heat distortion point (ASTM) of 100° C.

The heat-distortion point was determined by the procedure given in the American Society for Testing Materials, Specification D648–41T, found in the American Testing Materials Book of Standards for 1942 on page 1060.

For purposes of comparison, styrene, alone, was subjected to the same polymerizing conditions employed for the preparation of the above copolymer. The product had a heat-distortion point of only 76° C.

The stability to heating of the present interpolymer was further illustrated by the following experiment: The compression molded specimen used above for the determination of heat distortion point was comminuted and the comminuted product subsequently molded in a Loomis injection machine at a cylinder temperature of 400° F. and a mold temperature of 150° F. The molded objects obtained were clear and colorless which indicates practically no decomposition even upon remolding and attests to the high heat stability of the interpolymer.

The dimensional stability of the present interpolymer was tested by immersing it in boiling water for 24 hours. At the end of this time there was no perceptible distortion of the molded specimen.

*Example 2*

A mixture consisting of 10 parts by weight of benzalphthalide and 90 parts by weight of styrene was subjected to the polymerization conditions described in Example 1. The hard, resinous product thus obtained had an alcohol soluble content of 4.6%. Solvent purification of the product by solution in dioxane and precipitation from alcohol gave a white, powdery interpolymer having a softening point of 130° C., a melting point of 215° C. and a decomposition point of over 250° C. A compression molded test specimen gave a heat distortion point of 93° C.

The interpolymer was soluble in benzene, dioxane, chloroform and ethyl acetate, insoluble in acetone and somewhat softened by gasoline.

The molded test specimen was boiled for 3 hours in a 10% aqueous solution of sodium hydroxide and then allowed to stand in the alkaline solution for 18 hours. At the end of that time there was no sign of either distortion or surface crazing. Thus, substantially no hydrolysis of the molded piece occurs in boiling alkali.

*Example 3*

A mixture consisting of 30 parts by weight of benzalphthalide and 70 parts by weight of styrene was subjected to polymerization employing the conditions described in Example 1. The hard, resinous material thus obtained had an alcohol-soluble content of 14.7%. Solvent purification was carried out by dissolving the hard resin in dioxane and precipitating the interpolymer by pouring the solution into alcohol. The white, powdery interpolymer thus obtained had a softening point of 145° C., a melting point of 230° C. and a decomposition point of over 250° C., as determined on the copper Maquenne bar. Evaluation of a compression molded test specimen gave a heat distortion point of 106.5° C.

The molded object was clear and colorless. It was not affected by immersion in hot dilute alkali or boiling water for long periods of time.

*Example 4*

A mixture consisting of 30 g. of benzalphthalide, 270 g. of styrene, 700 ml. of water, 3.5 g. of soap flakes and 0.5 g. of potassium persulfate was heated slowly during a time of one-half hour to a temperature of 90° C. and maintained at approximately that temperature for about 18 hours. Mechanical stirring was employed during this entire period. The resulting emulsion of polymeric material was poured into alcohol and precipitated by treatment with dilute aqueous sodium chloride. Upon filtration, washing and drying there was obtained a white, powdery interpolymer having an alcohol-soluble content of <0.1%, a softening point of 140° C., a melting point of 210° C. and a decomposition point of >250° C. Compression molded test specimens of the interpolymer had a heat distortion point of 92° C.

Interpolymers of styrene and benzalphthalide containing below, say, 50% of benzalphthalide may be injection molded by the ordinary injection molding technique. Interpolymers containing between 5% and 30% by weight of benzalphthalide being particularly suitable for injection molding operations.

When injection molding the herein described interpolymers it has been found that the temperature for molding does not differ materially from that employed when molding polystyrene. For example, an interpolymer prepared from a mixture consisting of 20 parts by weight of benzalphthalide and 80 parts by weight of styrene compares with the molding temperature of polystyrene as follows:

|  | Interpolymer | Polystyrene |
|---|---|---|
|  | °F. | °F. |
| Cylinder temperature | 400 | 400–450 |
| Mold temperature | 150 | 150 |

Although the heat distortion value of the interpolymer is considerably higher than for polystyrene, actually the molding conditions are no more severe than are those employed for polystyrene.

Because of the excellent thermal and physical properties of the present interpolymers they are valuable for the production of extruded, cast or molded parts for the following purposes:

Electrical insulation, particularly ignition and lighting fixtures for automotive and aeronautical purposes, also switches, sockets, lamp housings, commutators, telephone parts, such as hand sets and bases, flashlight cases, lampshades, vacuum cleaners, electrical shavers, refrigerator parts, hair dryers, rectifiers, transformers, rheostats, voltage regulators, etc., steering wheels, decorative parts, knobs and handles, radio parts, such as molded cases, plugs, adapters, coil forms, coaxial cable spacers, condensers, panel boards, high frequency lead-ins, antenna loops and bases, dental and surgical instruments and dentures, printing plates, photographic films, trays, spinnerets and spinning buckets, travelers, thread guides and shuttles for weaving and spinning, pumps, chemical tank lining material, gaskets, optical instruments and accessories.

Cast objects may be readily made by pouring the monomeric mixture or the partially polymerized viscous syrup into molds and carrying the polymerization to completion within the molds. When employed as an impregnating agent, for example, in the preparation of insulating tape, the tape may be impregnated with either the mixture of monomers or a partially polymerized syrup and polymerization subsequently carried out to completion in situ. A partially polymerized viscous syrup may also be advantageously employed in the manufacture of laminates.

For certain purposes the interpolymers may be drawn or extruded into threads or filaments. Fibrous material may be obtained by atomizing solutions of these resins in volatile solvents, under conditions whereby the solvent is evaporated and the fiber recovered in dry, fibrous form. Such material serves as an ideal heat and electrical insulator.

A variety of methods may be utilized in applying the principle of my invention, and the products produced thereby, the invention being limited only by the appended claims.

What I claim is:

1. The process of preparing solid copolymers which comprises mixing from 0.1 percent to 65 percent benzalphthalide and from 99.9 percent to 35 percent of styrene, and heating the mixture between 40° C. and 125° C., in the presence of a peroxy compound until a solid resinous composition is obtained.

2. The process of preparing solid polymers which comprises mixing from 0.1 percent to 65 percent benzalphthalide and from 99.9 percent to 35 percent of styrene, and heating at a temperature between 40° C. and 125° C., until a solid resinous composition is obtained.

3. The process of preparing solid copolymers which comprises mixing from 5 percent to 30 percent benzalphthalide and from 95 percent to 70 percent of styrene, and heating the mixture between 40° C. and 125° C., in the presence of a peroxy compound until a solid resinous composition is obtained.

4. The process of preparing solid copolymers which comprises mixing from 5 percent to 30 percent benzalphthalide and from 95 percent to 70 percent of styrene, and heating at a temperature between 40° C. and 125° C., until a solid resinous composition is obtained.

5. A copolymer having heat distortion point in excess of that possessed by polystyrene, being copolymers of 0.1 percent to 65 percent of benzalphthalide and from 99.9 percent to 35 percent of styrene.

6. A copolymer having heat distortion point in excess of that possessed by polystyrene, being copolymers of 5 percent to 30 percent of benzalphthalide and from 95 percent to 70 percent of styrene.

DAVID T. MOWRY.

No references cited.